UNITED STATES PATENT OFFICE.

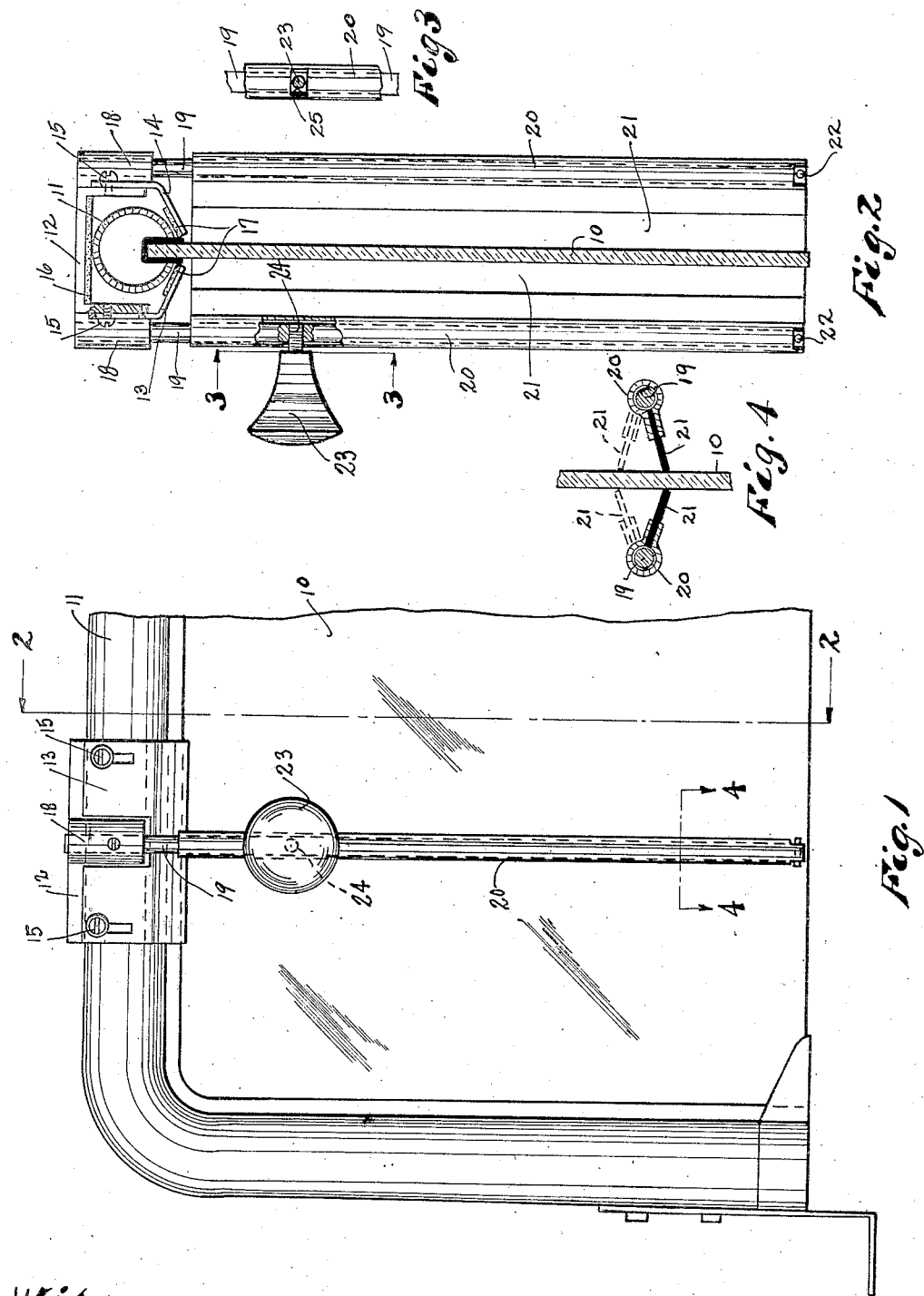

JOHN W. CAIN, OF CHICAGO, ILLINOIS.

WINDSHIELD WIPER.

1,406,341.  Specification of Letters Patent.  Patented Feb. 14, 1922.

Application filed September 27, 1920.  Serial No. 413,083.

*To all whom it may concern:*

Be it known that I, JOHN W. CAIN, a citizen of the United States, and a resident of the city of Chicago, county of Cook, and State of Illinois, have invented certain new and useful Improvements in Windshield Wipers, of which the following is a specification.

My invention relates to wind shield wipers, and has for its principal object the provision of a new improved arrangement and construction by the use of which a wind shield may be cleaned easily and expeditiously, and comprising means by which the device may be very readily attached in place.

Other objects will appear hereinafter.

The invention consists in the combinations and arrangements of parts hereinafter described and claimed.

The invention will be best understood by reference to the accompanying drawings forming a part of this specification and in which, Fig. 1, is a face view of one end portion of a wind shield with my improvements mounted thereon.

Fig. 2, is a section taken on line 2—2 of Fig. 1.

Fig. 3, is a section taken on line 3—3 of Fig. 2.

Fig. 4, is a section taken on line 4—4 of Fig. 1, and showing in dotted lines a changed position of certain of the parts.

Referring to the drawings 10 indicates the glass plate of a wind shield; the upper transverse frame part of which is indicated by the numeral 11. A channel bar 12 is mounted upon the frame bar 11, having angle bars 13 and 14 adjustably mounted upon the flanges thereof, the adjustability being secured by the use of slotted openings for the screws 15 by which said angle bars are mounted in position. A strip of fiber 16 is mounted upon the inner face of the web portion of the channel bar, and fiber strips 17 are mounted upon the inner faces of the bars or plates 13 and 14, such fiber plates being mounted in position to take the wear between the frame bar 11 and the slide-block comprising the channel 12 and the parts connected thereto. The fiber strips 16 and 17 also serve as means for reducing the sound to a minimum as the device is moved along the frame bar 11 as hereinafter described.

By making the plates or bars 13 and 14 adjustable with respect to the channel 12, the device is capable of being secured easily and quickly in position upon any ordinary size or shape of frame bar used in connection with wind shields.

The channel 12 is provided with vertically disposed sleeves 18 at opposite sides thereof, which constitute sockets for the reception of the upper end portions of rods 19 which extend downwardly along the opposite faces of the glass 10. Sleeves 20 are revolubly mounted upon the rods 19, being equipped with wipers 21 formed of india rubber, or other suitable material, being mounted in position to engage the opposite face of the glass 10. As is best shown in Fig. 3, the sleeves 20 are notched at their lower ends, pins 22 being mounted in the lower ends of the rods 19 to engage the slots in the sleeves for supporting the wipers and for limiting the rotary movement of the wipers about the rods.

Means is provided for moving the slide block and the wipers carried thereby transversely along the wind shield. In the construction shown, this means comprises a handle 23 of any approved type, mounted by means of a screw threaded pin 24 in a suitable screw threaded opening in the rod 19 upon the rear face of the wind shield. As is shown in Fig. 3, the opening through the sleeve 20 for the pin 23 is in the form of a slot 25, whereby the sleeve and the wiper are permitted to rock slightly about the rod 19.

When it is desired to use the device as above described for cleaning the glass of the shield upon which it is mounted, the operator merely grasps the handle 23 and applies pressure alternately to the right and left for moving the device as a whole transversely, the use of the fiber strips 16 and 17 for the bearing faces of the block upon the frame bar being adapted to permit a ready movement of the device. While I prefer to use fiber strips for lining the interior of the slide block, I do not wish to be restricted to the use of fiber, except as hereinafter claimed, since other materials may be available which will serve the same purpose.

As the device is moved toward the right in Fig. 1, the wipers will be caused to turn to the limit of their motion toward the left as shown in solid lines in Fig. 4, and when the device is moved toward the left in Fig.

1, the wipers will be turned by their frictional engagement with the glass to the limit of their motion toward the right as shown in dotted lines in said Fig. 4. In this way, the desired squeegee effect is obtained, and the wipers are rendered very effective for cleaning purposes.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. A device of the character described comprising in combination a short channel bar adapted to be mounted on a transversely extending frame bar of a wind shield; rods mounted on said channel bar and extending along the face of the glass of the wind shield on opposite sides thereof; sleeves revolubly mounted on said rods; wipers fixedly mounted on said sleeves; pins carried by the ends of said rods extending through circumferentially disposed openings in said sleeves for limiting the rotary movement of the wipers on the rods; and a handle mounted on the device for moving it from side to side upon the wind shield, substantially as described.

2. A device of the character described comprising in combination a short channel bar adapted to be mounted on a transversely extending frame bar of a wind shield; diagonally disposed plates adjustably mounted on the sides of said channel bar for holding same in position on the frame bar; lining strips carried by said channel bar and said diagonally disposed plates for reducing sound; rods mounted on said channel bar and extending along the face of the glass of the wind shield on opposite sides thereof; sleeves revolubly mounted on said rods; wipers mounted on said sleeves; pins carried by said rods extending through circumferentially disposed openings in said sleeves for limiting the rotary movement of the wipers on the rods; and a handle mounted on the device for moving it from side to side upon the wind shield, substantially as described.

In testimony whereof I have signed my name to this specification in the presence of two subscribing witnesses.

JOHN W. CAIN.

Witnesses:
JOSHUA R. H. POTTS,
ROSE K. TRIB.